United States Patent [19]

Borchard

[11] 4,223,515
[45] Sep. 23, 1980

[54] TREE SHAKER MOUNTING

[75] Inventor: Leslie J. Borchard, Mile End, Australia

[73] Assignee: M.B.P. (S.A.) Pty. Limited, Mile End, Australia

[21] Appl. No.: 6,118

[22] Filed: Jan. 24, 1979

[30] Foreign Application Priority Data

Jan. 25, 1978 [AU] Australia .............................. PD3128

[51] Int. Cl.² ........................................... A01D 46/00
[52] U.S. Cl. .................................. 56/328 TS; 56/15.5
[58] Field of Search ................... 56/15.5, 328 TS, 329

[56] References Cited

U.S. PATENT DOCUMENTS

| | | | |
|---|---|---|---|
| 2,729,199 | 1/1956 | Jones | 56/328 TS |
| 3,509,702 | 5/1970 | Rickerd | 56/328 TS |
| 3,548,578 | 12/1970 | Shipley, Jr. | 56/328 TS |
| 3,599,403 | 8/1971 | Gantz | 56/15 J |
| 3,812,662 | 5/1974 | Savage | 56/328 TS |

Primary Examiner—Louis G. Mancene
Assistant Examiner—Paul J. Hirsch
Attorney, Agent, or Firm—Norbert P. Holler

[57] ABSTRACT

Mounting for a tree shaker having a pair of mounting brackets secured to respective sides of the tractor, a guide extending transversely beneath the tractor chassis, and supporting a slide which is coupled to the near side mounting bracket by means of a piston/cylinder assembly whereby the slide is movable in a transverse direction with respect to the tractor, the slide carrying on it a tree shaker.

4 Claims, 2 Drawing Figures

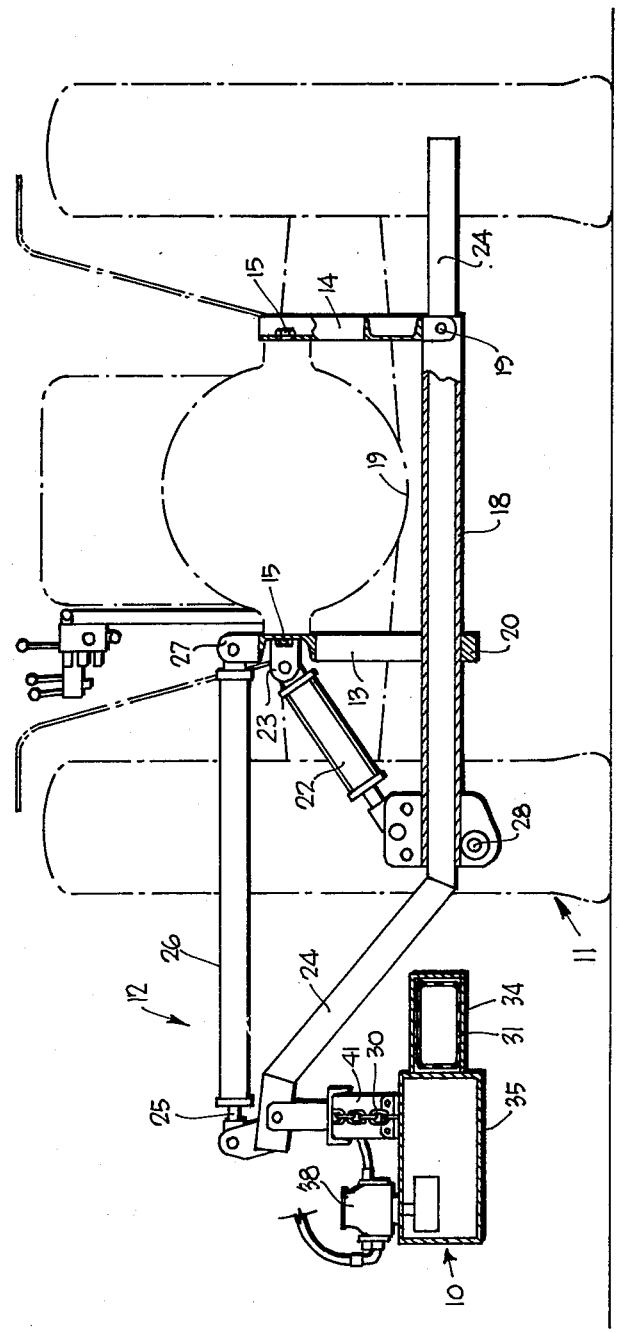

TREE SHAKER MOUNTING

This invention relates to mounting means for the mounting of a tree shaker to a tractor.

BACKGROUND OF THE INVENTION

Tree shakers are devices which incorporate rubber clamp jaws associated with a clamping piston/cylinder assembly and the whole arrangement is carried on a shaker head, the shaker head comprising a hydraulic motor and this is driven by hydraulic power from a tractor and drives a mass eccentrically so as to impart shaking. When the device is clamped to the trunk of the tree, the tree is shaken and its fruit, nuts or the like are removed from the tree.

It is desirable that the harvesting should take place as quickly as possible in an orchard, but heretofore tree shakers have been located in front of or at the rear of the tractors which carry them so that it becomes necessary for an operator to drive up to or back up to a tree, clamp the tree, drive the shaking mechanism, release the clamp, back away from the tree and drive on to the next tree. The main object of this invention is to provide an improved mounting whereby a tractor can drive between adjacent rows of trees and can extend the clamping and vibrating head transversely from the tractor, thereby avoiding the continual reversing of the tractor.

BRIEF SUMMARY OF THE INVENTION

In this invention there is provided a pair of mounting brackets secured to respective sides of the tractor, a guide extending transversely beneath the tractor chassis, and supporting a slide which is coupled to the near side mounting bracket by means of a piston/cylinder assembly whereby the slide is movable in a transverse direction with respect to the tractor, the slide carrying on it a tree shaker.

More specifically, a mounting for securing a tree shaker to a tractor comprises a pair of brackets, securing means which secure said brackets to respective sides of the tractor, a guide extending beneath the chassis of the tractor transversely with respect to the direction of tractor travel, connecting means joining the guide to one of the brackets, a slide projecting from one side of the tractor, inter-engaging surfaces on the slide and guide guiding the slide for transverse movement, a piston/cylinder assembly coupling the slide and mounting means fixed with respect to one of the brackets, and operative to effect said transverse movement, and means coupling the tree shaker to the projecting end of the slide.

BRIEF DESCRIPTION OF THE DRAWINGS

An embodiment of the invention is described hereunder in some detail with reference to and is illustrated in the accompanying drawings, in which FIG. 2 is a diagrammatic section taken on plane 2—2—2 of FIG. 1.

Figure 1:
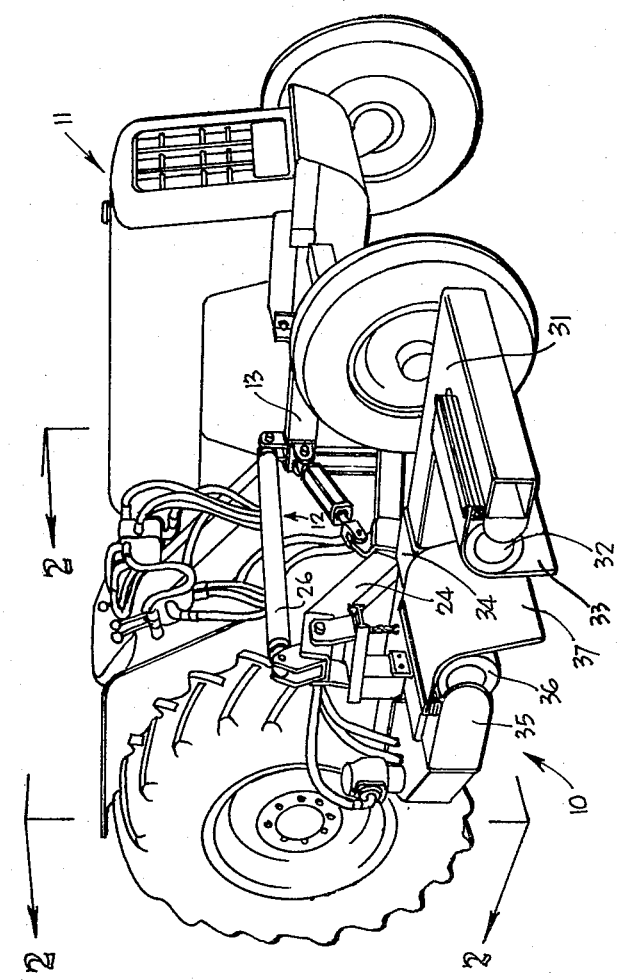
FIG. 1 is a perspective view of a tree shaker secured to a tractor by the mounting of this invention.

In this embodiment, a tree shaker 10 of known type is secured to a tractor 11 by a mounting 12. The tractor illustrated herein is an "International" tractor, model 454, this being particularly suitable for use in this invention since it is supplied with mounting pads on each side to which the mounting 12 is secured, with bolts as described hereunder. However, most other tractors can also be used by changing the configuration of the mounting 12.

The mounting 12 is provided with two mounting brackets 13 and 14, the bracket 14 being bolted to a tractor mounting pad on the "off" side of the tractor and the bracket 13 to the "near" side of the tractor 11 by bolts 15. The terms "off" and "near" are employed in this specification to refer respectively to the side of the tractor remote from the shaker 10 and the side adjacent the shaker 10.

There is provided a tubular guide 18 extending beneath the chassis 19 of the tractor 11, and one end of the tubular guide is mounted to the off side mounting bracket 14 with a pivot pin 19 so that the shaker can pivot upwardly or downwardly. The bracket 13 comprises a rest bar 20 which limits downward pivotal movement of the guide 18. The other end of guide 18 is coupled to the near side bracket 13 by means of a tilt cylinder 22 which is operable between a pair of space plates 23 on the bracket 13 and the guide tube 18, to raise and lower the near side end thereof.

The guide tube 18 contains a slide 24 which slidably engages its inner walls, and the slide extends upwardly and outwardly away from the tractor at its outermost end at the "near" side of the tractor 11, being connected to the piston rod 25 of a transverse piston/cylinder assembly 26, the transverse piston/cylinder assembly being trunnion mounted at 27 on the near side mounting bracket 13. A roller 28 on the guide 18 provides a low friction support for slide 24. The outer end of the slide has suspended from it the shaker 10 by a chain 30 and rubber block 41, and the shaker 10 comprises an L-shaped frame member 31, one leg of the frame member 31 supporting a "moving" rubber clamp jaw 32 which is tubular in section and which is itself protected by an apron 33 of rubber or other material. The other leg of the L-shaped frame 31 is movable within a short tubular guide portion 34 on the shaker head 35, which is that portion of the shaker 10 which is suspended. A hydraulic clamping piston/cylinder assembly (not shown) is cooperable between the shaker head 35 and the L-shaped frame 31, and the frame 31 is thereby movable into a clamping position, the shaker head 35 also having a tubular clamp jaw 36 which is also protected by a flexible rubber sheet 37. The shaker head 35 is provided with a hydraulic motor 38, the shaker 10 generally being in accordance with prior art.

In use, the tractor is driven along the space between two rows of trees, and when the tractor becomes abreast a tree, the transverse piston/cylinder assembly 26 is actuated to drive the slide 24 transversely outwardly away from the tractor until the shaker head clamps are positioned one each side of the tree trunk. The tilt piston/cylinder combination 22 is operated to adjust the height correctly for the tree concerned, the clamping piston/cylinder assembly is operated to bring the jaws 32 and 36 together to firmly clamp the tree, and the hydraulic motor 38 is actuated to effect the operation of the shaker head. After the tree has been shaken, the clamps are released, the slide retracted by the transverse cylinder and the tractor driven on to the next tree in the row.

It has been found that this invention greatly expedites the shaking of trees, and reduces the amount of time taken in harvesting a crop. The arrangement is inexpensive and simple, and is easily fitted to tractors of different design by varying the configuration of the mounting brackets 13 and 14.

What is claimed is:

1. A mounting for securing a tree shaker to a tractor, comprising:
   a pair of brackets,
   securing means which secure said brackets to respective sides of the tractor,
   a guide extending beneath the chassis of the tractor transversely with respect to the direction of tractor travel,
   connecting means joining the guide to one of the brackets,
   a slide projecting from one side of the tractor,
   inter-engaging surfaces on the slide and guide guiding the slide for transverse movement,
   a piston/cylinder assembly coupling the slide and a mounting means which is fixed with respect to one of the brackets, and operative to effect said transverse movement,
   and means coupling the tree shaker to the projecting end of the slide.

2. A mounting for securing a tree shaker to a tractor, according to claim 1, wherein said guide is tubular, and comprises a roller which partly supports said slide.

3. A mounting for securing a tree shaker to a tractor, according to claim 1, wherein said connecting means comprises a pivot pin which inter-connects the off-side end of said guide to the offside said bracket for pivotal movement of said guide in a vertical plane.

4. A mounting for securing a tree shaker to a tractor, according to claim 3, comprising a further piston/cylinder assembly interconnecting the near-side end of said guide to the near-side said bracket, and operable to effect said pivotal movement of said guide.

* * * * *